(12) United States Patent
Campbell

(10) Patent No.: US 6,629,714 B2
(45) Date of Patent: Oct. 7, 2003

(54) MODULAR TRUCK BED STORAGE APPARATUS

(76) Inventor: Richard Campbell, P.O. Box 205, Strafford, MO (US) 65757

( * ) Notice: Subject to any disclaimer, the term of this patent is extended or adjusted under 35 U.S.C. 154(b) by 0 days.

(21) Appl. No.: 09/905,618

(22) Filed: Jul. 13, 2001

(65) Prior Publication Data

US 2003/0011207 A1 Jan. 16, 2003

(51) Int. Cl.[7] ................................. B60N 3/12
(52) U.S. Cl. ............ 296/37.6; 296/37.1; 296/39.2
(58) Field of Search ................ 296/37.6, 39.2, 296/37.1, 100.02, 100.07; 224/404, 542, 402, 539, 403

(56) References Cited

U.S. PATENT DOCUMENTS

| | | | | | |
|---|---|---|---|---|---|
| 4,469,364 | A | * | 4/1984 | Rafi-Zadeh | 296/37.6 |
| 4,488,669 | A | * | 12/1984 | Waters | 296/37.6 |
| 4,573,731 | A | * | 3/1986 | Knaack et al. | 296/37.6 |
| 4,733,898 | A | * | 3/1988 | Williams | 296/37.6 |
| 4,789,195 | A | * | 12/1988 | Fletcher | 296/37.6 |
| 4,830,242 | A | * | 5/1989 | Painter | 296/37.6 |
| 4,909,558 | A | * | 3/1990 | Roshinsky | 296/37.6 |
| 4,915,437 | A | * | 4/1990 | Cherry | 296/37.6 |
| 5,088,636 | A | * | 2/1992 | Barajas | 296/37.6 |
| 5,121,959 | A | * | 6/1992 | King | 296/37.6 |
| 5,398,987 | A | * | 3/1995 | Sturgis | 296/37.6 |
| 5,454,684 | A | * | 10/1995 | Berens | 296/26.1 |
| 5,743,584 | A | * | 4/1998 | Lance et al. | 296/37.6 |
| 5,845,952 | A | * | 12/1998 | Albertini et al. | 296/37.6 |
| 5,897,154 | A | * | 4/1999 | Albertini et al. | 298/37.6 |
| 5,979,725 | A | * | 11/1999 | Lehrman | 224/539 |
| 5,988,473 | A | * | 11/1999 | Hagan et al. | 296/37.6 |
| 5,996,868 | A | * | 12/1999 | Paradis | 224/539 |
| 6,318,781 | B1 | * | 11/2001 | Mc Kee | 296/37.6 |
| 6,322,123 | B1 | * | 11/2001 | Garrison et al. | 296/37.1 |
| 6,328,364 | B1 | * | 12/2001 | Darbishire | 296/39.2 |
| 6,328,366 | B1 | * | 12/2001 | Foster et al. | 296/37.6 |
| 6,422,629 | B2 | * | 7/2002 | Lance et al. | 296/37.6 |
| 2002/0014505 | A1 | * | 2/2002 | Lance et al. | 296/37.6 |

* cited by examiner

Primary Examiner—Kiran Patel
(74) Attorney, Agent, or Firm—Husch & Eppenberger, LLC; Grant D. Kang

(57) ABSTRACT

The present invention is a modular truck bed storage container which is attachable to a second storage container module to form a single storage system which can span the truck bed and has an upper surface for cargo support that may span the truck bed and in which the upper surface may replicate the configuration and/or appearance of a truck bed liner. The modular truck bed storage container has a removable sliding drawer. Each modular truck bed storage container is reversible in orientation to fit the asymmetric configuration of each side of the truck bed. A variety of accessories may be conveniently attached to the modular truck bed storage container.

9 Claims, 16 Drawing Sheets

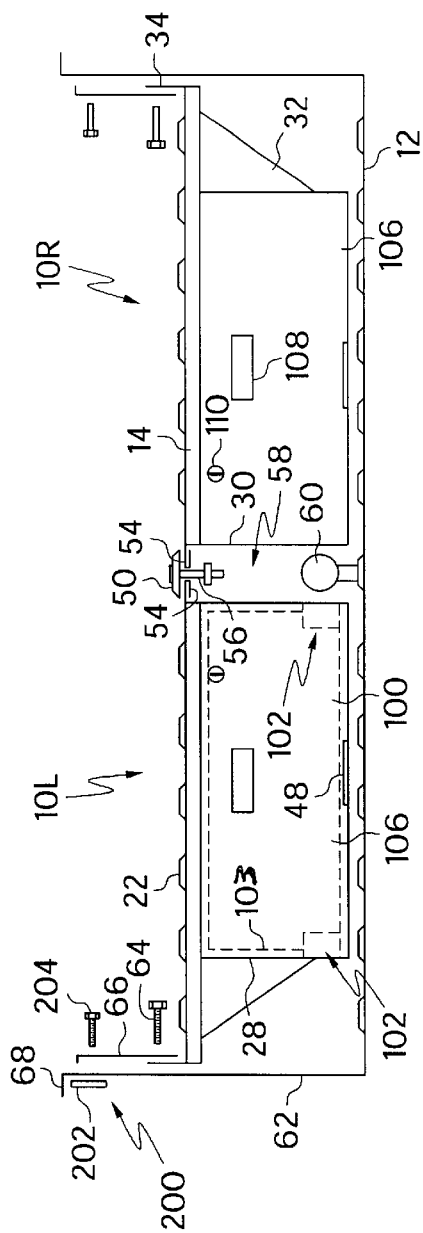
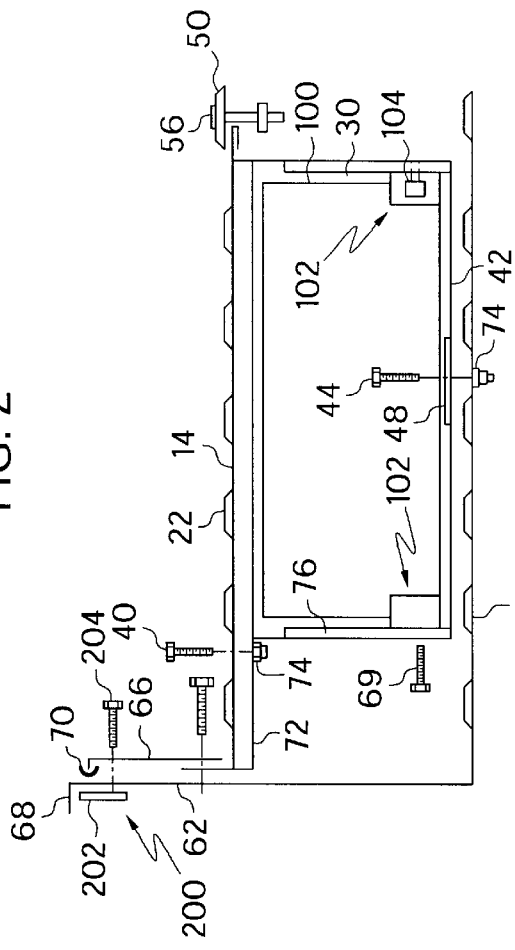

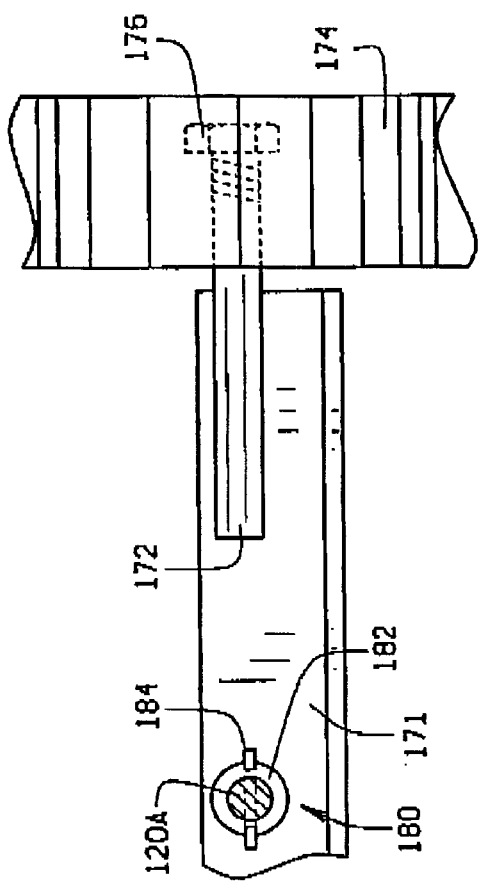
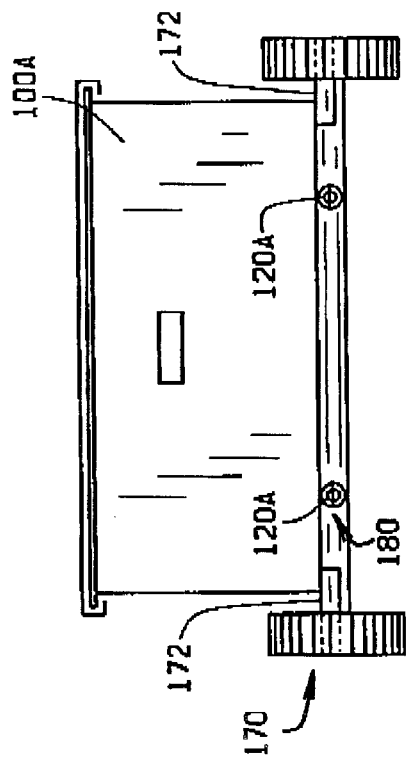
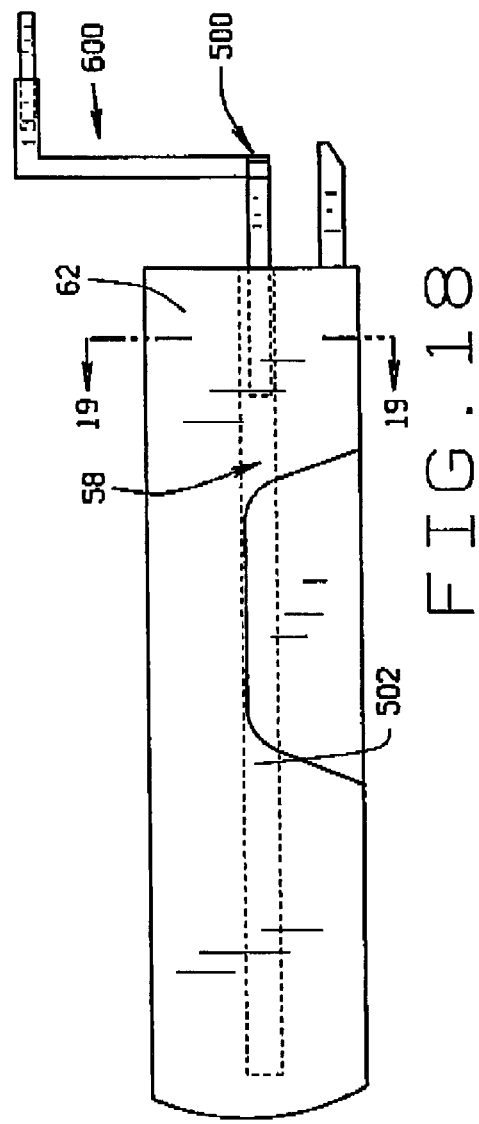
FIG. 15B
FIG. 15A
FIG. 18

MODULAR TRUCK BED STORAGE APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to storage containers for trucks and, more particularly, to a modular storage container for the bed of a pickup truck.

2. Related Art

General use trucks with an open rear body, i.e. pickup trucks, are utilized for a broad range of applications. A wide range of accessories have also been developed to provide enhanced capabilities for pickup trucks. Among the accessories commercially available are basic bed liners constructed from a variety of materials such as synthetic resins, polymers and metals, as well as numerous forms of storage containers and several types of mechanical equipment. The storage containers range in variation from a simple affixed toolbox to multichambered toolbox systems which can exceed the dimensions of the truck bed and reach heights above the truck cab.

Products which combine multiple accessory features are also available. A plastic bed liner with a drainage channel surface and an added quarter-length cross-bed tool box having an upper surface similar to the bed liner is one example. Alternatively, a storage container having compartments with hinged lids can cover a part of a truck bed. This container might be half the height of the truck's side rails, and could be combined with an overhanging block and tackle for loading and unloading the compartments.

One particular form of accessory is a storage container which spans the majority or all of the breadth of a truck bed. Often such a container will rise to a height in between the truck bed floor and the top of the side rails, and will extend close to, but not past the tailgate. An example of this form of storage container is the Weather Guard Pack Rat® Drawer Unit Model 312 sold by the Naack Manufacturing Company of Crystal Lake, Ill. This storage container has a specialized upper surface to prevent slipping and includes a sliding drawer for the containers' contents.

Existing approaches to truck bed-disposed, drawer-containing storage containers have limitations. The containers need to be capable of supporting significant loads and are hence heavily constructed. The desire to cover a truck bed may require custom construction tailored to individual truck models and will frequently require considerable installation effort. A container of this form is usually installed permanently due to the installation difficulties. The option of readily switching between utilizing the truck with or without the container is thus unavailable. The individual model tailoring also prevents the manufacturer from marketing a particular storage container model for use with a broader range of trucks.

The prior approaches are unable to provide a user the option of partial or complete coverage of a truck bed with the just one production model of container system. Readily switching a single container system between the sides of a truck bed is also not possible with prior approaches. The limitations of existing truck bed containers systems also restrict their ability to accommodate complementary equipment.

SUMMARY OF THE INVENTION

Accordingly, in view of the prior approaches and limitations, the modular truck bed container system and complementary equipment of the present invention was developed. The present invention is a modular truck bed storage container which is attachable to a second storage container module to form a single storage system which can span the truck bed and has an upper surface for cargo support that may span the truck bed and in which the upper surface may replicate the configuration and/or appearance of a truck bed liner.

Specifically, the present invention is a modular truck bed storage container which is securable to either side (right or left) of a truck bed. The modular truck bed storage container has horizontal dimensions commensurate with a longitudinally sectioned truck bed, and is securable to a second modular truck bed storage container to form a combined storage container system which can span an entire truck bed. The modular truck bed storage container is readily removable and reinstallable.

The present invention is also a modular truck bed storage container which is disposable on either side of a truck bed in reversible orientations to fit to the asymmetric configuration of each side of the truck bed and still be able to receive a rearward opening, longitudinally sliding internal drawer regardless of the side disposed on. The modular truck bed storage container has a completely removable internal longitudinally sliding drawer.

The modular truck bed storage container has an upper cargo support surface that replicates the configuration and/or appearance of a truck bed liner. The upper surface is selectively constructed either to be intermediate the height of the wheel wells and the top of the truck sides, or is constructed to be intermediate the height of the wheel wells and the floor of the truck bed.

The modular truck bed storage container of the present invention accommodates a wheel well of a truck bed equally well regardless of the side of the truck bed the module is disposed on, for a variety of truck models.

The present invention is also a modular truck bed storage container which includes at least one support member which extends rearward from the module to assist in the support of an extended interior drawer. The support member has a facilitating component, such as a roller, at one end to ease the loading and unloading of a removable drawer. The modular truck bed storage container has selectively operable stops to restrict the motion of a sliding interior drawer.

The present invention is also a modular truck bed storage container with an interior drawer and sliding lid for the drawer. The lid may extend along selectable fractions of the drawer's length to provide selectable variation in the degree of exposure of the drawer's contents when the drawer is extended from the container.

When a first modular truck bed storage container module is attached to a second storage container module to form a single storage system, the storage container system provides a space between the modules for the disposition of other accessories such as a goose neck ball.

The modular truck bed storage container provides space between its side and the truck's side for other accessories such as a winch and line or a compressed air supply.

The modular truck bed storage container of the present invention may be combined with a winch for loading and unloading assistance.

The modular truck bed storage container may also be combined with a crane for loading and unloading assistance.

The modular truck bed storage container is adaptable to a variety of truck beds.

BRIEF DESCRIPTION OF THE DRAWINGS

The accompanying drawings, which are incorporated in and form a part of the specification, illustrate the embodiments of the present invention. Together with the description, the drawings serve to explain the principles of the invention.

FIG. 2 is a rear partially exploded view of the pair of connected storage container modules installed in a truck bed according to a first embodiment of the present invention also shown in FIG. 1.

FIG. 3 is an enlarged partially-exploded cross-sectional view taken along line 3—3 of FIG. 1 of a left storage container module disposed on a truck bed according to a first embodiment of the present invention.

FIG. 15A is an end view of a separated drawer and wheeled conveyance according to the embodiment of the present invention depicted in FIG. 13.

FIG. 15B is an enlarged end view of a detail of the separated drawer and wheeled conveyance depicted in FIG. 15A.

FIG. 18 is a side view of connected storage containers mounted in a truck bed with an extending duct and crane according to the present invention.

DETAILED DESCRIPTION OF THE PREFERRED EMBODIMENT

In the following detailed descriptions of the drawings, identically numbered elements in different drawings refer to the same element.

Figure 1:
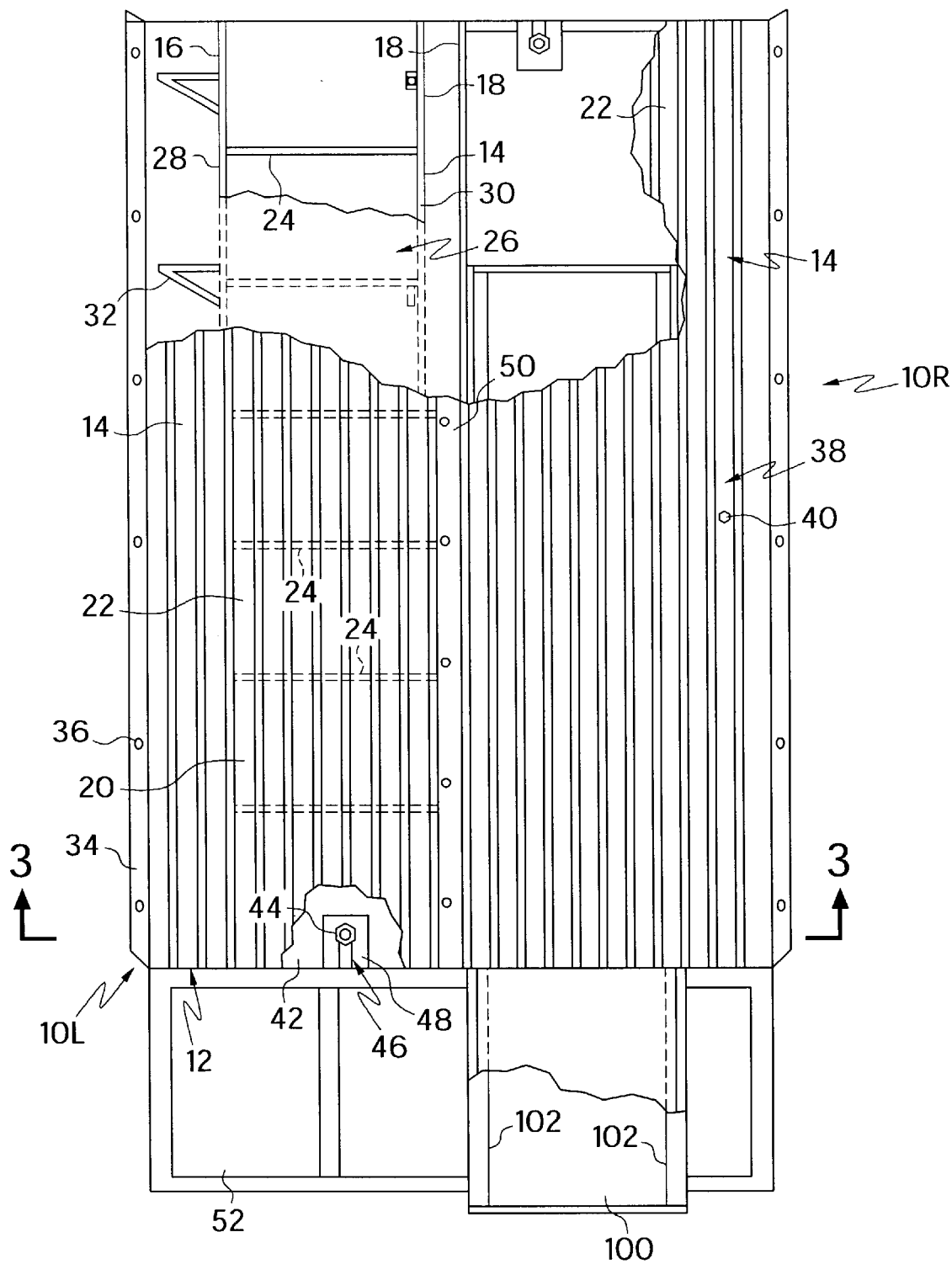
FIG. 1 is a top partial cutaway view of a pair of connected storage container modules according to a first embodiment of the present invention.

FIG. 1 is a top view of a pair of storage container modules 10L and 10R according to the first embodiment of the present invention in partial cutaway. Storage container module 10L is depicted in a first orientation for deploying on a left side of a truck bed 12. Storage container module 10R is depicted in a second orientation for deploying on a right side of a truck bed 12.

A housing 14 has a first side 16 for positioning adjacent a truck bed side (not depicted) and a second side 18 for positioning in the general vicinity of the truck bed's longitudinal center line. The housing 14 has a top 20 which has an upper surface 22. Supports 24 within the housing top 20 reinforce the upper surface 22. A passageway 26 is formed within the housing 14. Specifically, a pair of vertical longitudinally-extending walls, 28 and 30, define passageway 26. The wall 28 is a part of the first side 16. The wall 30 is a part of the second side 18. The upper reaches of the walls 28 and 30 anchor the ends of a series of supports 24.

Gussets 32 provide reinforcing support from the wall 28 to the portion of the upper surface 22 extending outward of the wall 28. The outermost reach of the upper surface 22 includes a vertical joint flange 34. A series of openings 36 are longitudinally spaced along the joint flange 34. Aperture 38 penetrates the upper surface 22.

A mounting bolt 40 passing through aperture 38 secures the housing 14 to a wheel well (not depicted) in the truck bed 12. A bottom 42 of the housing 14 is secured to the truck bed 12 by a bolt 44. In securing the housing 14, the bolt 44 passes through an aperture 46. Aperture 46 is located in a mounting plate 48 which is affixed to the bottom 42. The pair of modules 10L and 10R are arranged with their second sides 18 secured together at their joint strips 50. With a truck tail gate 52 down, a drawer 100, which is slidably disposed within the housing 14, may emerge (depicted as partially emerged in FIG. 1).

FIG. 2 is an end-on, partial cross-section view, looking forward from the rear of the truck, of the pair of modules 10L and 10R arranged as in FIG. 1. The joint strip 50 overlaps second side upper surface tabs 54 for securing together the upper surface 22 upon tightening of the fastener 56. A space 58 between the right and left modules 10R and 10L remains after securing the upper surfaces 22 together. The space 58 is available for disposition of various accessories such as a goose neck ball 60.

Figure 16:
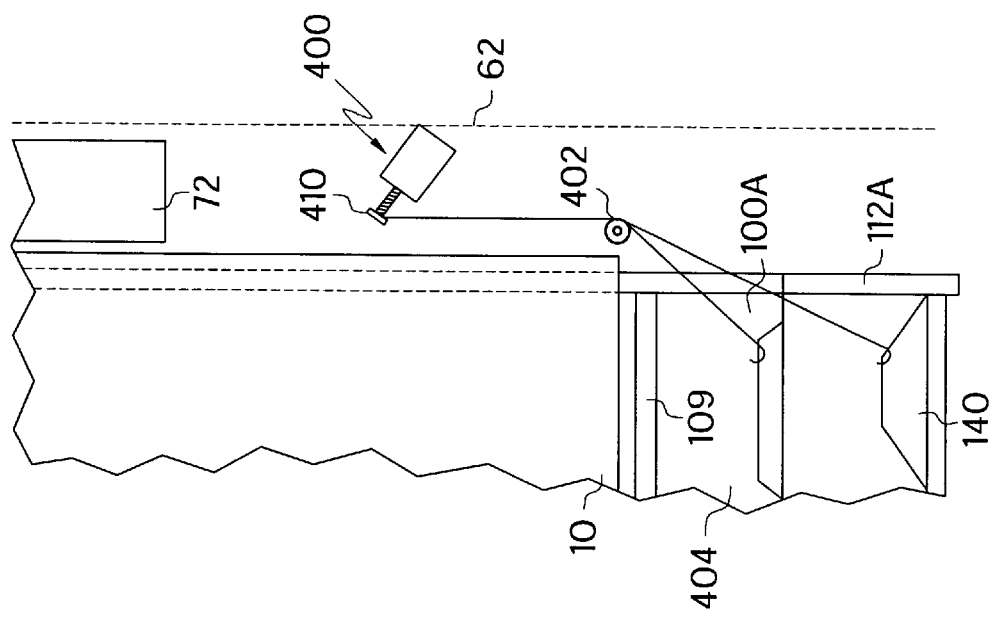
FIG. 16 is a top view of another embodiment including a winch and pulley according to the present invention.

The drawers 100 are depicted in broken line in their relation to the housings 14. A pair of rabbets 102 are disposed along the lower longitudinal portion of third and fourth sides 103 of the drawer 100. Each of the drawers 100 have front faces 106 which have front handles 108 (rear handles 109 are shown in FIG. 16) and locks 110. The vertical joint flanges 34 are disposed for positioning along the truck bed sides 62. A carriage bolt 64 interconnects the vertical joint flanges 34 with a side flange 66. The side flange 66 is positioned for securing to the truck bed sides 62 with a nut and bolt assembly 200. The nut and bolt assembly 200 includes an asymmetrical nut 202 and a bolt 204.

FIG. 3 is an enlarged, partially-exploded cross-sectional view of the module 10L and left truck side 62. The lower right rabbet 102 provides a channel for receiving a series of rollers 104 (which are disposed one behind another from the view of FIG. 3). The rollers 104 are fixed to the wall 30 at their axes to allow free rotation. Receiving a like series of rollers 104 fixed to wall 28 is the rabbet 102 formed in the wall 30 (not depicted). The rollers 104 are supporting the drawer 100 for longitudinal motion in the housing 14. A stop 69 operating by a screw action is anchored within wall 30. Rotating the stop 69 extends it into the rail 112. The stop 69 does not interfere with the motion of the drawer longitudinally when the stop is in a first position away from contact with the drawer 100. A second position for arresting motion of the drawer by frictional force results from rotating the stop 69 until it makes contact with the drawer 100. Multiple forms of construction and modes of operation for the stop 69 are well known to those having skill in the art, and lie within the scope of the present invention. The particular embodiment of the stop 69 described is exemplary and is not intended to be limiting.

A weather strip 70 provides a seal between the truck side rail 68 and the top of the side flange 66. The top of the truck bed wheel well 72 retains a nut zert device 74 that receives the mounting bolt 40. Tightening the bolt 40 in the nut zert 74 secures the outer extent of the upper surface 22 to the wheel well 72 (not shown in FIG. 3, but shown in FIG. 10B). A like nut zert 74 in the truck bed 12 receives the bolt 44. Tightening the bolt 44 in the nut zert 74 secures the mounting plate 48, and thus the housing bottom 42, to the truck bed 12.

Nut and bolt assembly 200 is illustrated in FIGS. 2 and 3 but omits various components for clarity. A detailed view of assembly 200 is provided in FIGS. 8A, 8B and 8C.

Figure 4:
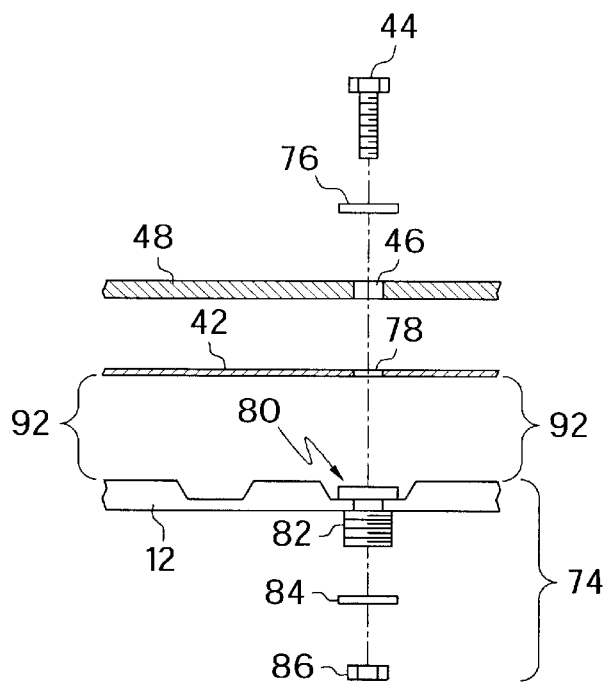
FIG. 4 is an exploded view of a nut zert element of the storage container module according to a first embodiment of the present invention.

FIG. 4 is an exploded view of the construction and interrelation of the parts of the nut zert device 74, the mounting plate 48, and the housing bottom 42 relative to the truck bed 12. The bolt 44 passes successively through a washer 76, the aperture 46 in the mounting plate 48, and an opening 78 in the housing bottom 42. The nut zert device 74 is receiving the bolt 44. The nut zert device 74 is disposed within an opening 80 in the truck bed 12 and includes a threaded channel 82 for screwing the bolt into. The nut zert 74 is held in the opening 80 by a washer 84 and nut 86. A plurality of pads 92 are affixed to the lower outer surface of the bottom 42 for easing the placement of the module 10 into the truck bed 12 as seen clearly in FIG. 4. It should be understood that the pads 92 are only one way of lessening friction to facilitate installation and removal of the present invention. The present invention includes numerous other ways of lessening friction that are well known to those of skill in the art. Thus, the particular embodiment of the pads 92 described is exemplary and is not intended to be limiting.

Figure 5:
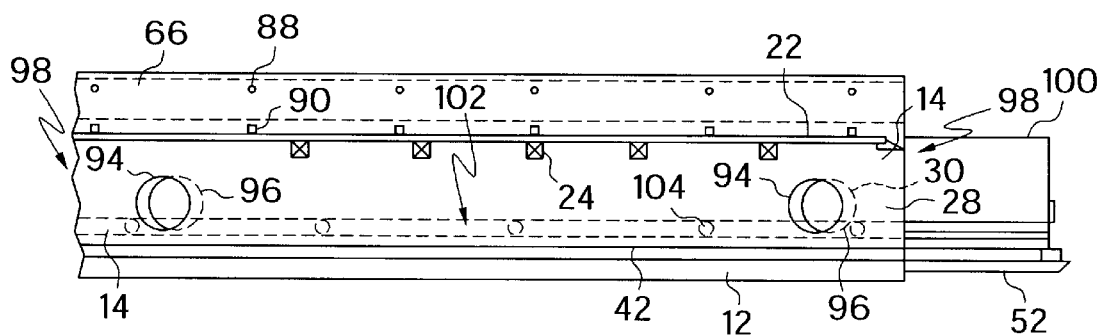
FIG. 5 is a side view of a housing, drawer and side flange according to a first embodiment of the present invention.

FIG. 5 is a side view of the housing 14, partially extended drawer 100, and side flange 66 of the module 10 according to the first embodiment of the present invention. A plurality of holes 88 are arrayed along the upper portion of the side flange 66. The nut and bolt assemblies 200 comprising asymmetrical nut 202, bolt 204, and biasing bolt 205 passing through the holes 88 secure the side flange 66 to the truck side. A plurality of perforations 90 are arrayed along the lower portion of the side flange 66. The bolts 64 passing through the perforations 90 secure the side flange 66 to the housing top 22.

As can be seen from the drawing, FIG. 5 is a view of the side of the truck with the wall 28 closer to the viewer. The optional ports 94, 96 (depicted as circular but may also be differing shapes) in the wall 28 provide access for various purposes through the wall 28. The optional ports 94, 96 are each disposed in the general vicinity of the ends 98 of the housing 14. The optional ports 96 are positioned in the wall 30 at similar relative locations to the optional port 94 in the wall 28. The optional ports 96 exist to permit user access to the bolt 44 through the wall 30. Thus, when a user reaches through the optional port 96, the user can tighten the bolt 44. The housing end 98 closest to the front end of the truck is secured to the truck bed 12 by tightening of the bolt 44. When installing two modules 10L and 10R, respectively, to span the truck bed, one module, for example module 10L, is installed first followed by installation of a second module 10R.

Figure 6A:
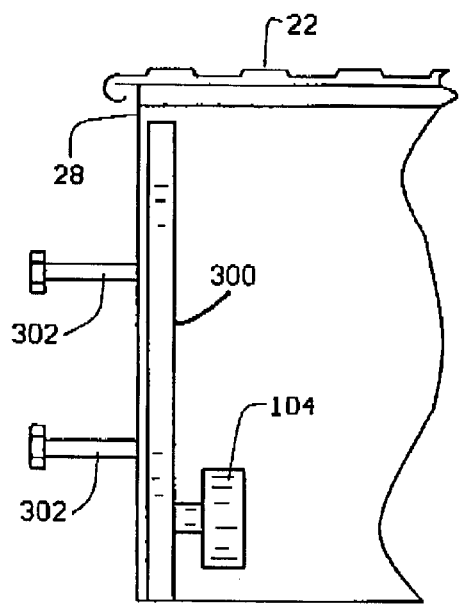
FIGS. 6A, and 6B are rear and side views, respectively, of wall brace and roller details of a storage container module according to the present invention.
Figure 6B:
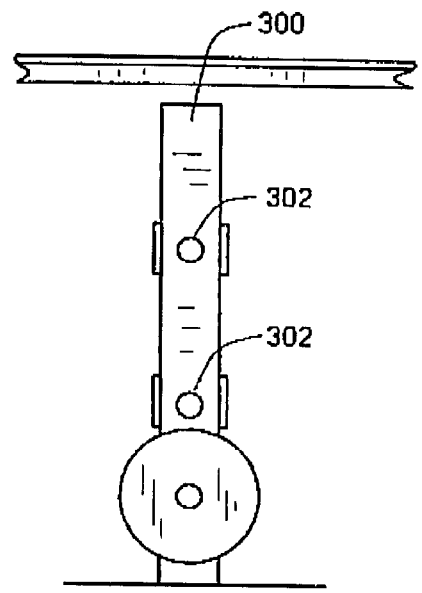

FIGS. 6A and 6B show longitudinal and side views, respectively, of optional variations in the construction of the module 10. Wall braces 300 are welded to walls 28 and 30 at intervals spaced along the walls' longitudinal extents. The wall braces 300 provide reinforcing support to the walls 28 and 30. The wall braces 300 provide more substantial settings for attaching additional equipment than the unbraced walls 28 and 30 provide. The additional equipment can be attached either directly to the wall braces 300 or to one or more structural bolts 302 that are affixed to the wall braces 300. The wall braces 300 also provide additional structural support for attaching the rollers 104.

Figure 7A:
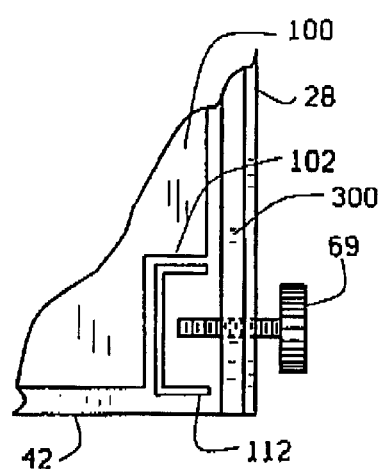
FIGS. 7A and 7B are rear partial cutaway and side partial cutaway views, respectively, of a detail of a storage container module according to the present invention.
Figure 7B:
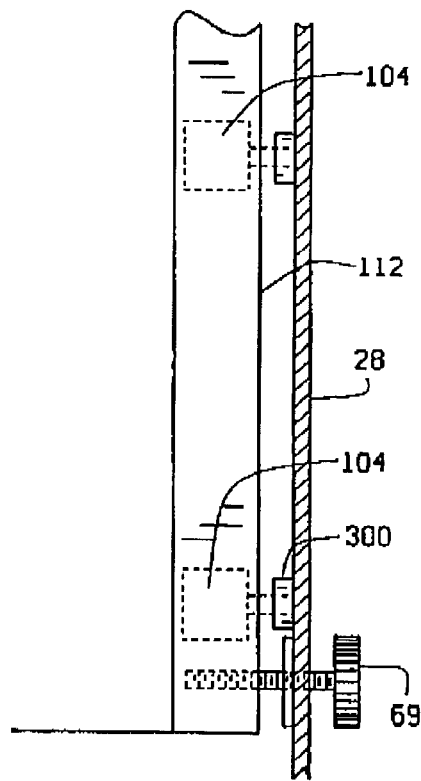

FIGS. 7A and 7B show rear and top views, respectively, of details of the interrelations of parts within the rabbet 102. In FIG. 7A a rail 112 is disposed within the rabbet 102. The stop 69 contacts the rail 112 when restricting the sliding motion of the drawer 100. In FIG. 7B the rollers 104 supporting the drawer 100 are shown in relation to the rail 112.

Figure 8A:
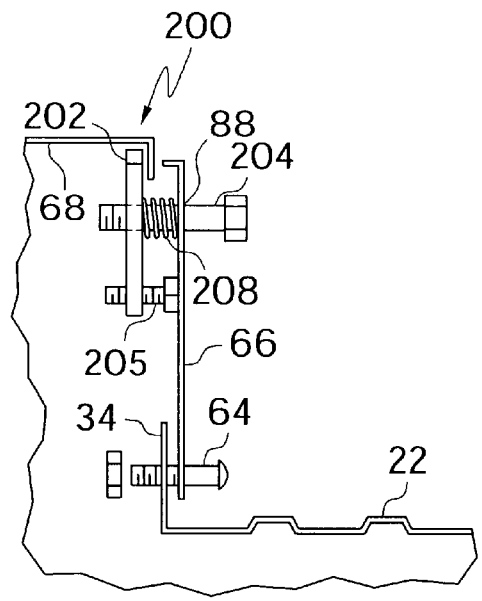
FIGS. 8A, 8B, and 8C are rear end, side detail, and enlarged side detail views, respectively, of a nut and bolt assembly according to the present invention.
Figure 8B:
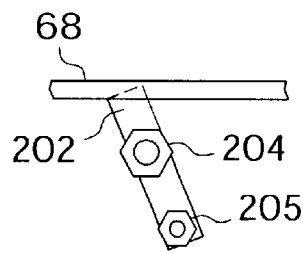
Figure 8C:
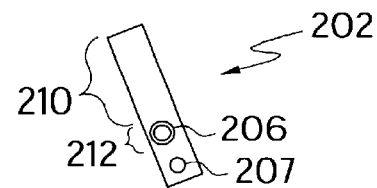

FIGS. 8A, 8B, and 8C show rear end-on, side detail, and expanded side detail views, respectively, of the nut and bolt assembly 200. The threaded hole of the asymmetrical nut 202 receives the cooperatively-dimensioned bolt 204. A spring 208 is coiled about the bolt 204 in a compressed state between the asymmetrical nut 202 and the flange 66. The spring 208 biases the asymmetrical nut 202 in an axial direction against the bolt's threads. The biasing holds the asymmetrical nut 202 in a static orientation relative to the bolt 204 in the absence of other forces. A symmetrical nut 202 extends further downward to receive bolt 205 through hole 207. A portion 210 of the asymmetrical nut 202 is seen to extend a greater distance from the hole 206 than does a portion 212. In operation, the asymmetrical nut 202 is adjacent the truck side rail 68. When positioned adjacent the truck side rail 68, the open space around the asymmetrical nut 202 is insufficient to permit a complete rotation of the nut portion 210 about the bolt 204, but is sufficient to permit a complete rotation of the nut portion 212 about the bolt 204. Rotating the bolt 204 causes a rotation as a whole of the nut and bolt assembly 200 until the portion 210 of nut 202 contacts the side rail 68. Rotating the bolt 204 further tightens the nut and bolt assembly 200 by moving the asymmetrical nut 202 towards the bolt 204 head. The tightening of nut and bolt assembly 200 thus secures together the side rail 68 and the flange 66 without needing to access the asymmetrical nut directly.

Once the side rail 68 and the flange 66 are secured by the tightened nut and bolt assembly 200, the asymmetrical nut 202 is held against further rotation by frictional force between the asymmetrical nut 202 and the flange 66. Loosening of the nut and bolt assembly 200, after being tightened to secure together the side rail 68 and the flange 66, occurs upon counterrotating of the bolt 204, since the asymmetrical nut 202 is held against also counterrotating. The loosening of nut and bolt assembly 200 can thus be accomplished without needing to access the asymmetrical nut 202 directly. Counterrotating the bolt 204 loosens the asymmetrical nut 202 sufficiently to cease the holding effect of the frictional force on the asymmetrical nut 202. The nut and bolt assembly 200 then rotates as a whole and the nut and bolt assembly 200 releases the securing of the side rail 68 and the flange 66.

Figure 9:
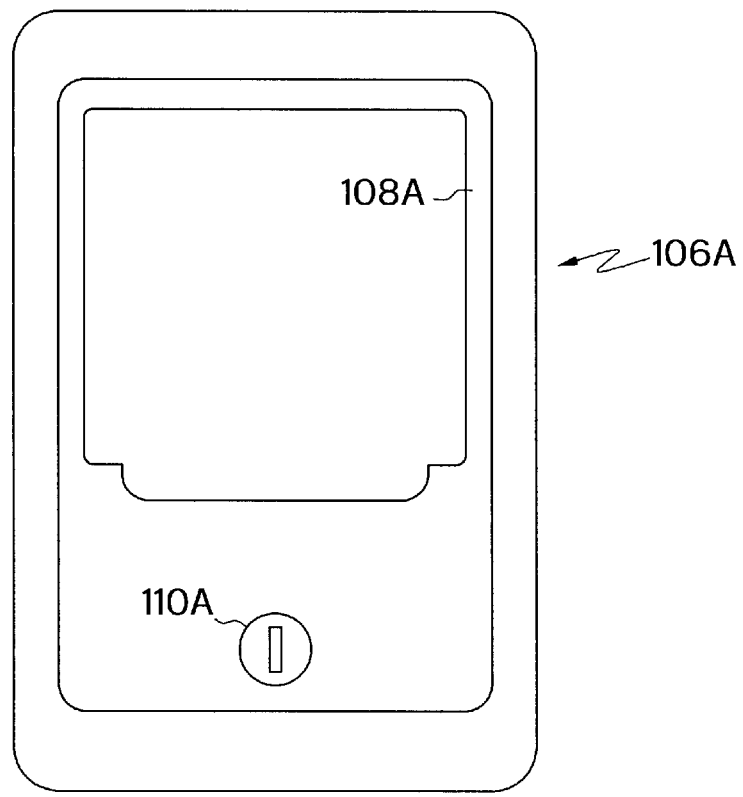
FIG. 9 is an end view of an alternative drawer handle according to the present invention.

FIG. 9 shows an alternative handle 108A and lock 110A for utilization on a drawer front face 106A. Handle 108A provides a different form than handle 108 for grasping and sliding the drawer 100 in the housing 14. Lock 110A is positioned below handle 108A, in contrast to the position of lock 110. The face 106A may be structured as an integrated unit which includes the lock 110A and handle 108A when desirable for manufacturing ease.

Figures 10A, 10B, 10C:
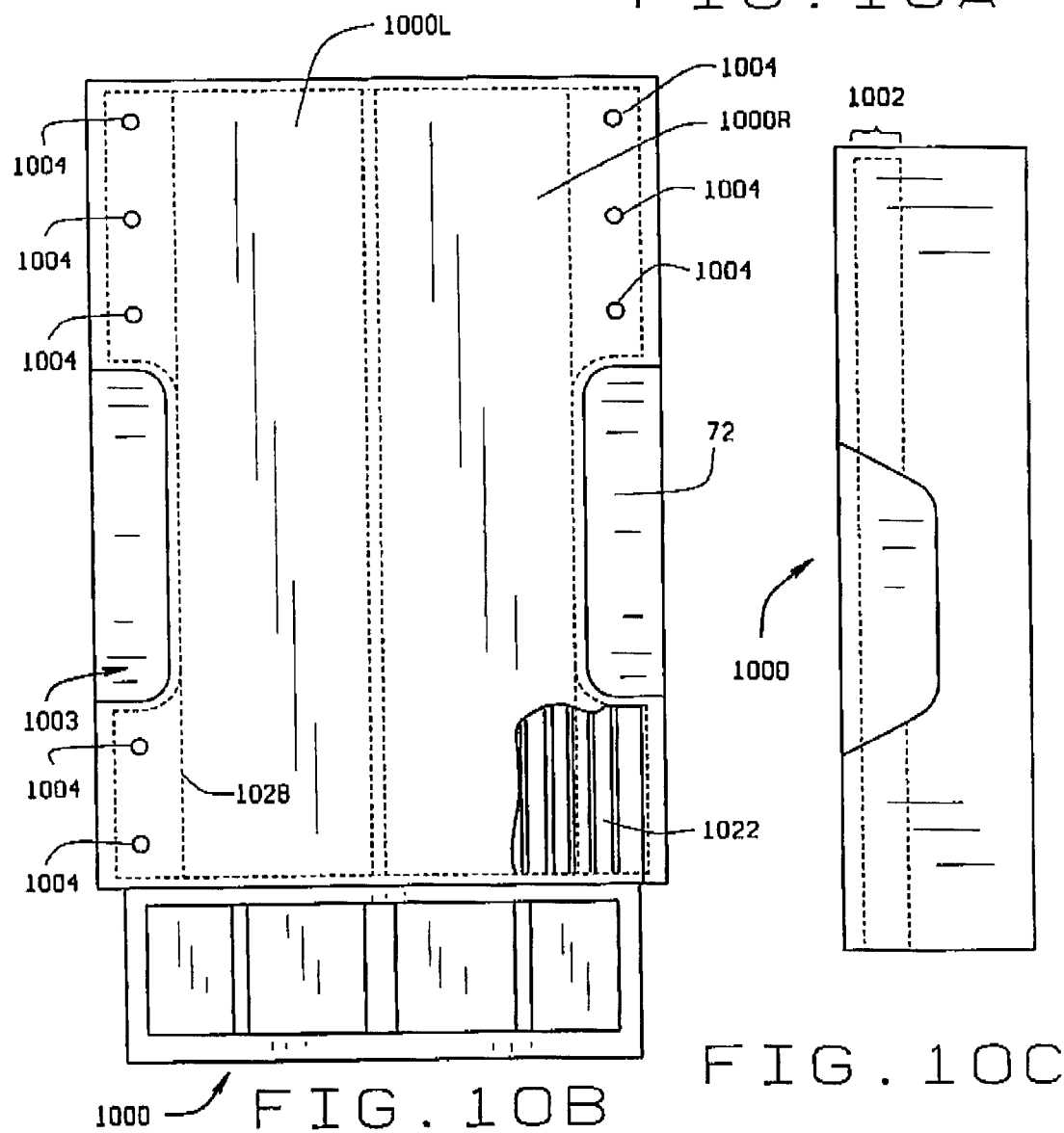
FIGS. 10A, 10B, and 10C are rear, top and side views, respectively of a storage container module according to a second embodiment of the present invention.

FIGS. 10A, 10B, and 10C show a module 1000 according to a second embodiment of the present invention in rear, top and side views, respectively. FIGS. 10A and 10B are depicting a pair of modules 1000L and 1000R in their respective orientations on the left and right sides of the truck bed 12. The module 1000L or 1000R differ from the module 10L or 10R, respectively, in that the height 1002 of module 1000 is less than the height of the truck wheel well 72. Hence, the module 1000 has an inset 1003 for fitting around the wheel well 72. A plurality of stands 1004 provide vertical support for the top 1022. The stands 1004 are spaced along the longitudinal extent of the portion of the top 1022 which extends beyond the wall 1028.

Figure 11:
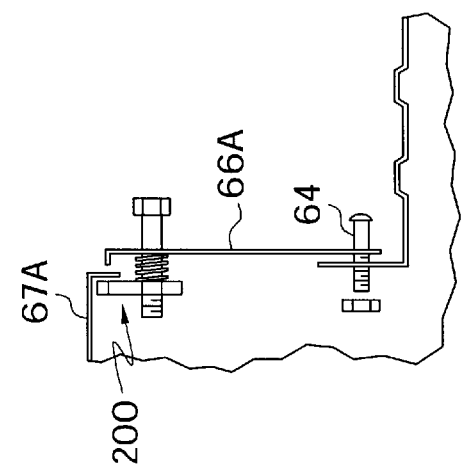
FIG. 11 is a side view of a removable drawer and alternative extendible rail according to another embodiment of the present invention.

FIG. 11 shows a side view of an alternative side flange embodiment 66A. The side flange 66A has an upper brim 67A which reaches over the top of the side rail 68. The operation of the side flange 66A to the truck side 62 and the joint flange 34 are the same as for the side flange 66.

Figure 12B:
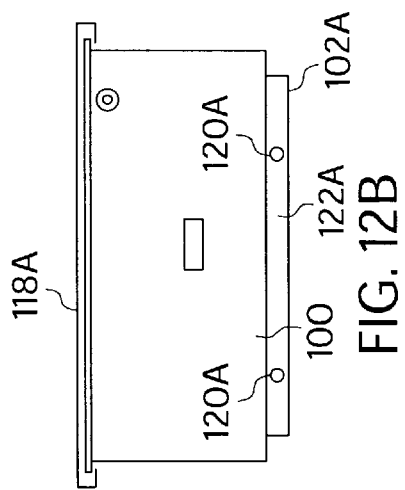
FIGS. 12A and 12B are a perspective view and a rear end view, respectively, of an alternative drawer and rail embodiment according to the present invention.
Figure 12A:
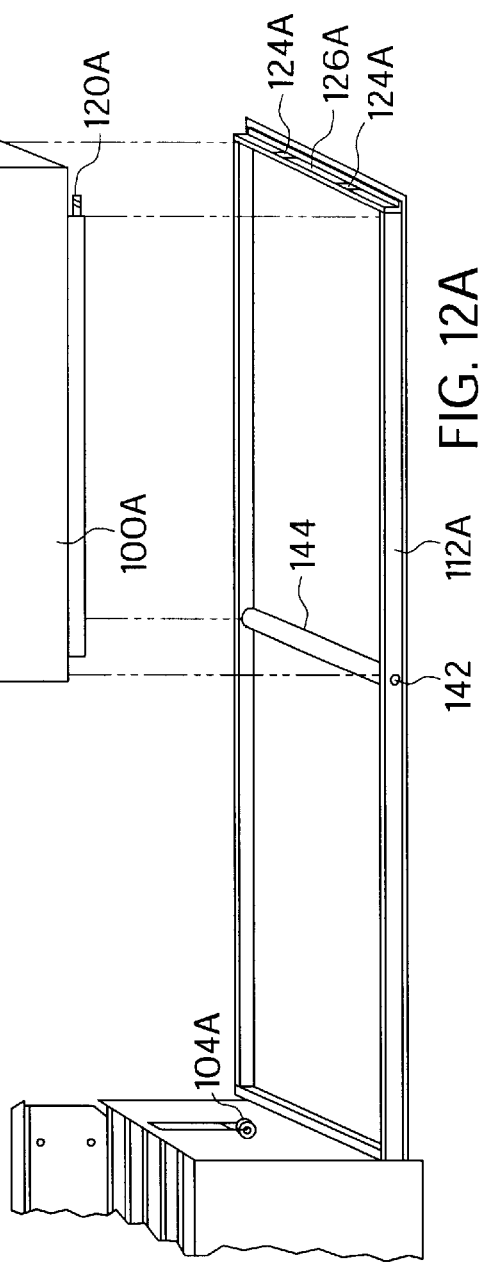

FIG. 12A shows a perspective view of an alternative detaching drawer 100A and an alternative rail embodiment 112A; and FIG. 12B, a depiction which shows a rear view of the detaching drawer 100A; as well as the interrelation of the detaching drawer 100A and the rail 112A. The rail 112A is of heavy construction to accommodate potentially large weight stresses.

In an alternative embodiment (not shown) of the invention, the length of an alternative lid 118A is less than the length of the drawer 100A and is longitudinally slidable, relative to the drawer 100A. This alternative lid 118A is moveable to provide access to a portion of the interior of either end of the drawer 100A, while still providing coverage of the remainder of the interior of the drawer 100A, when drawer 100A is at least partially outside of housing 14.

In yet another alternative embodiment (not shown) of the invention, roller 144 can be equipped with an L-shaped, curved fork (not shown) which rotates as roller 144 rotates. Drawer 100A may then be equipped with a projection such as a flat plate (not show) to catch the furcation (not shown) of the L-shaped, curved fork (not shown) to prevent undesired movement of drawer 100A.

Figure 13:
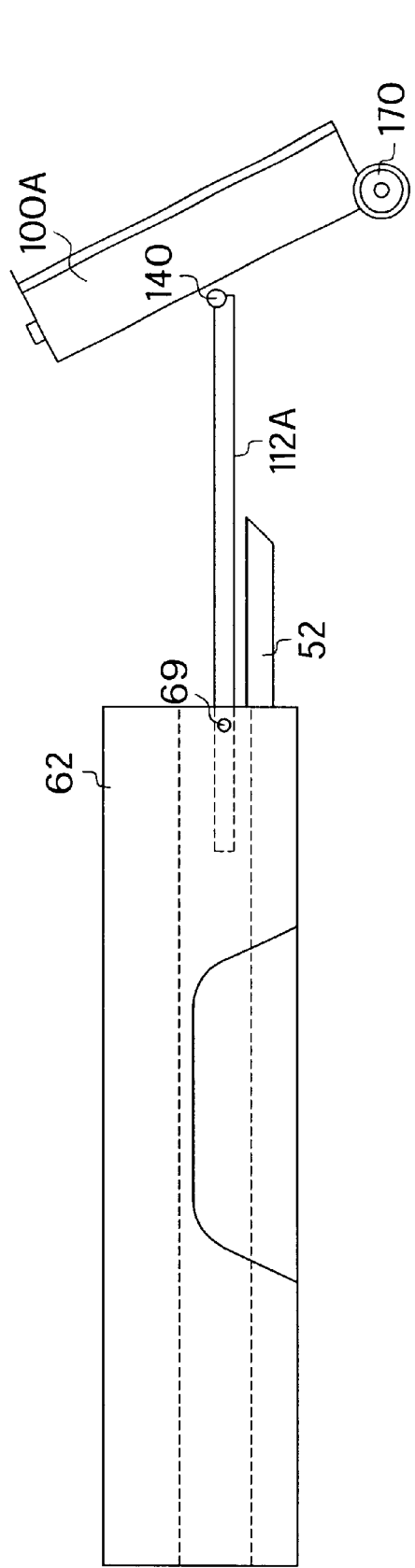
FIG. 13 is a side view of a removable drawer and alternative extendible rail according to another embodiment of the present invention.

FIG. 13 shows a side view of a removable detaching drawer 100A and rail 112A with the additional element of a pivot bar 140. The detaching drawer 100A is shown separating from (or being placed in) the rail 112A. The detaching drawer 100A is supported at an angle by the pivot bar 140. The pivot bar 140 eases moving the detaching drawer 100A by rotating about its longitudinal axis oriented at a right angle to the plane of FIG. 13. Attaching a wheeled conveyance 170 to the lower front corner edge of the detaching drawer 100A enables the wheeled conveyance 170 to assist in moving detached drawer 100A when it is separated from the housing 14.

It is recommended that the non-wheeled end of drawer 100A be adapted to receive an attachable handle (not shown) to facilitate maneuvering or wheeling drawer 100A. It has been determined that a handle (not shown) disposed at an angle to drawer 100A is best because it provides mechanical advantage (leverage) to the user.

Figure 14A:
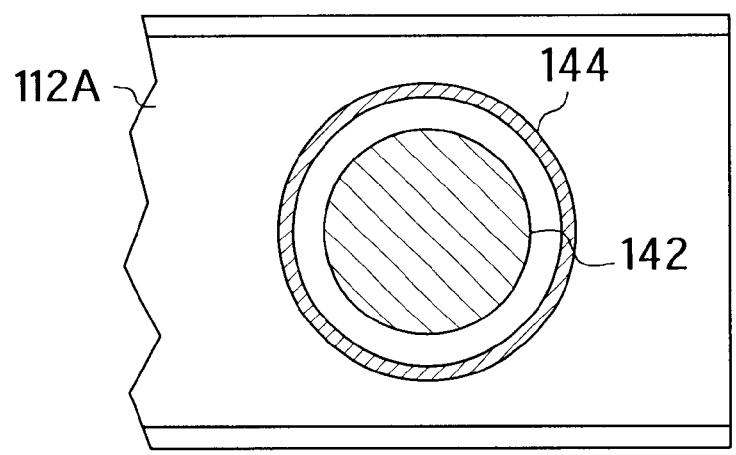
FIGS. 14A and 14B are side and end views, respectively, of details of a pivot arm and rail according to the present invention.
Figure 14B:
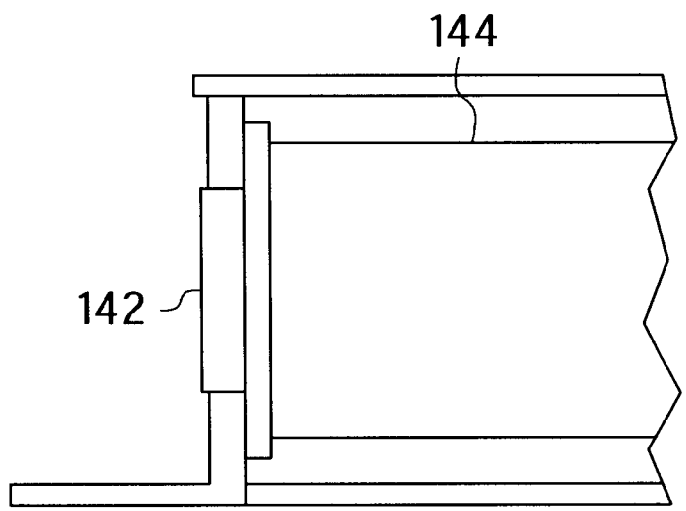

FIGS. 14A and 14B show side and rear views, respectively, of details of the construction of the pivot arm 140 and its disposition relative to the rail 112A. Central rod 142 spans the rails 112A. The front cross member 126A is reduced in height to provide space for a rotating pivot tube 144. The rod 142 is passing through the hollow center of the rotating pivot tube 144.

FIG. 15A shows a view of a separated detaching drawer 100A and wheeled conveyance 170; and FIG. 15B, a depiction which shows an expanded view of details of the construction of the conveyance 170 and its connection to the detaching drawer 100A. Both FIG. 15A and FIG. 15B are rear views. In FIG. 15A, the studs 120A are received by the wheeled conveyance 170. Snap-pin assemblies 180 secure together the wheeled conveyance 170 and the studs 120A In FIG. 15B, the wheeled conveyance 170 includes a transverse axle beam 171 holding the axles 172. The wheels 174 are rotating about the axles 172. The axle nuts 176 are anchoring the wheels 174. The axle beam 171 is affixed to the detaching drawer 100A when the struts 120A are fastened into the linch pin assemblies 180. The struts 120A slide in a channel 182 of the linch pin assemblies 180. A linch pin 184 is inserted through an opening (not depicted) in the struts and channel to lock the struts 120A.

The following Figures describe a variety of auxiliary equipment and features of differing embodiments, separately and in combination with the storage container module.

FIG. 16 shows a top view of another embodiment of the present invention having a winch 400 and pulley 402 in combination with the storage module 10. Attaching to the exterior of the wall 28 is a winch 400. The winch 400 fits between the wall 28 and the truck side 62, behind the wheel well 72, and below the top surface 22. Line 404 extends from the winch 400, along the pulley 402, and through the port 94. The line 404 is releasably connected to the rear drawer handle 109. In operation, the winch 400, which is preferably electrically powered, provides assistance to the raising and lowering of the detaching drawer 100A. Thus, the electric winch 400 assists in passing a heavily loaded detaching drawer 100A over the pivot arm 140. The winch can also assist in moving a heavy detaching drawer 100A over the dividing member 114A.

Figure 17:
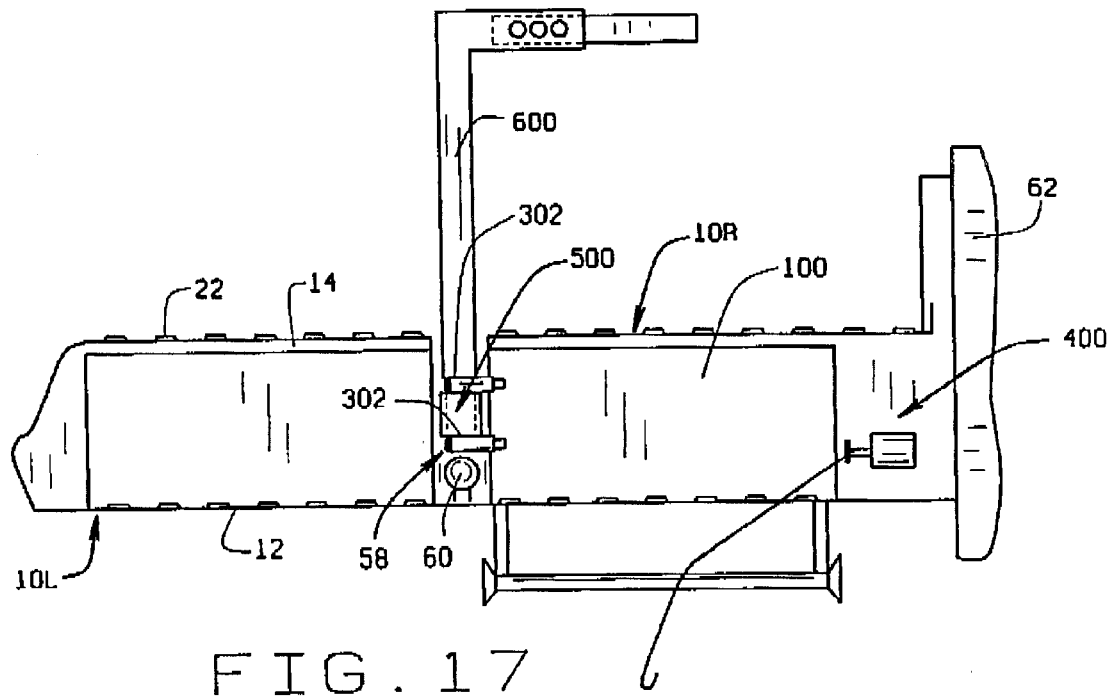
FIG. 17 is a rear view of another embodiment including an extending duct according to the present invention.

FIG. 17 shows a rear end-on view of another embodiment of the connected storage container modules with auxiliary equipment including an extending duct 500. In the space 58 between the connected modules 10L and 10R is an extending duct 500 held by structural bolts 302. The duct 500 is supporting a crane 600.

FIG. 18 shows a side view of the connected storage container modules with auxiliary equipment including an extending duct 500 shown in FIG. 17. The portion of the space 58 closer to the front of the truck is holding a source of compressed air 502. The source of compressed air 502 may be a compressed air tank, an air compressor, or any other means of providing a source of compressed air well known to those of skill in the art. Including an integral source of compressed air enables the placement of an inflatable bladder (not depicted) in the detaching drawer 100A, over the contents of the drawer (such as tools). Inflation of the bladder after the drawer has been loaded secures the drawer contents against shifting when the truck is in motion.

Figure 19:
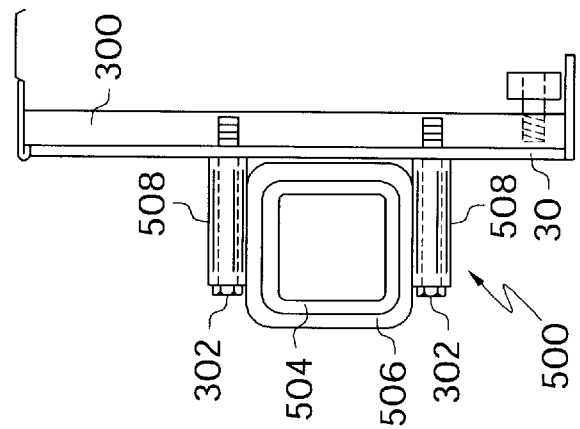
FIG. 19 is an enlarged, end cross-sectional view of the extending duct depicted in FIG. 18.

FIG. 19 shows an expanded end-on, cross-section view of the extending duct 500 of FIG. 17. The duct 500 consists of an inner, sliding sleeve 504 fitting within an outer fixed sleeve 506. The outer sleeve 506 is attached to brackets 508 mounted on structural bolts 302. Bolts 302 can be reversed to facilitate removal of outer sleeve 506.

Figure 20:
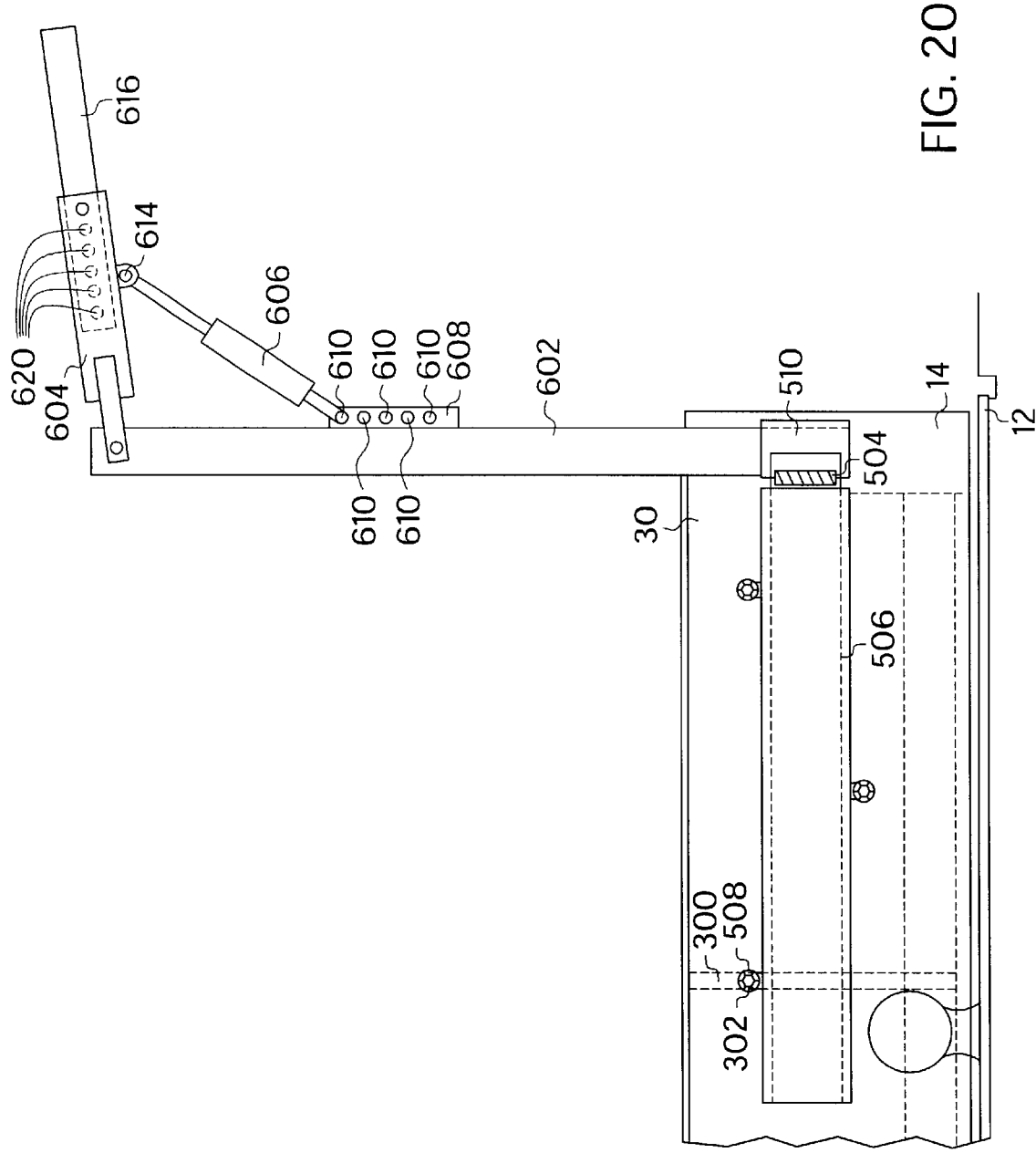
FIG. 20 is a side view of a storage container module with an extending duct and a crane according to another embodiment of the present invention.

FIG. 20 shows a side view of another embodiment of the storage container module 10 in combination with an extending duct 500 and a crane 600 according to the present invention. Attached to the farthest extending end of the inner sleeve 504 is a collar 510. The collar 510 provides support to vertically standing auxiliary equipment such as one crane embodiment 600A depicted in FIG. 20. A vertical column 602 of crane 600A slides into the collar 510. A crane arm 604 is pivotally connected to the upper reach of column 602 at an angle controlled by the air cylinder 606. The air cylinder 606 is pivotally connected to a positioning plate 608 at one of the holes 610. The crane arm 604 is pivotally connected to the air cylinder 606 at the pin 614. A crane arm extension 616 slides within the crane arm 604. A plurality of holes 620 in the crane arm extension 616 provide optional attachment points for a crane arm pin 620. The ability to attach crane arm pin 620 at differing holes 620 provides a range of extension degrees for the crane arm extension 616 relative to crane arm 604. An additional alternative embodiment of the crane 600A may include a solid bar (not depicted) in the place of the air cylinder 606.

Figure 21:
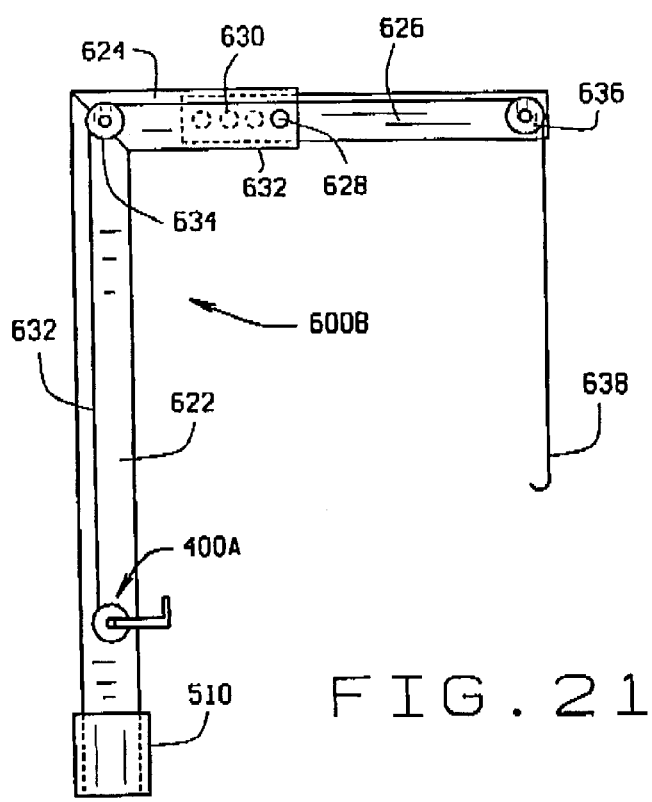
FIG. 21 is a side view of an alternative embodiment of a crane to be combined with the storage container module according to the present invention.

FIG. 21 shows an alternative embodiment of the auxiliary crane 600B. The crane 600B has a vertical column 622 which stands in the collar 510. A crane arm 624 is in a fixed relation to vertical column 622. An arm extension 626 slides within the crane arm 624. The positioning of arm extension 626, relative to the crane arm 624, is variable. A crane arm pin 628 fastening in one of a plurality of holes 630 within an arm extension portion 632 holds the position of the arm extension 626. The crane 600B also has a hand winch 400A for pulling a line 632. The line 632 passes from the winch 400A, over the pulley 634, and over the pulley 636. The line 632 is terminated by a hook 638. While both cranes are shown with specific related equipment, either crane can be employed with a variety of well known winch mechanisms, as well as winches positioned in a variety of ways, without departing from the scope of the present invention.

Figure 22:
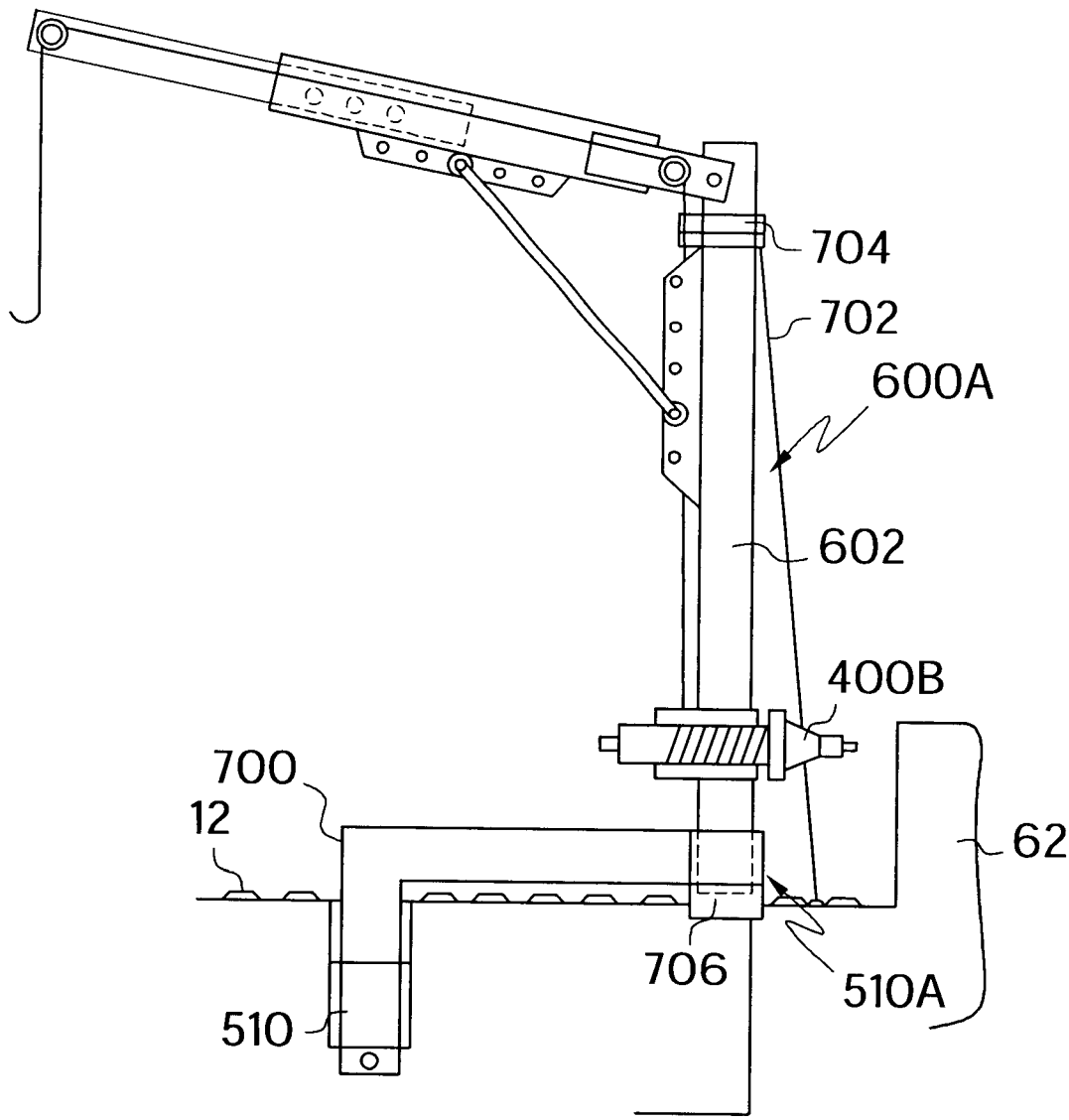
FIG. 22 is a rear view of an auxiliary side-arm in combination with the crane of another embodiment according to the present invention.
Figure 23:
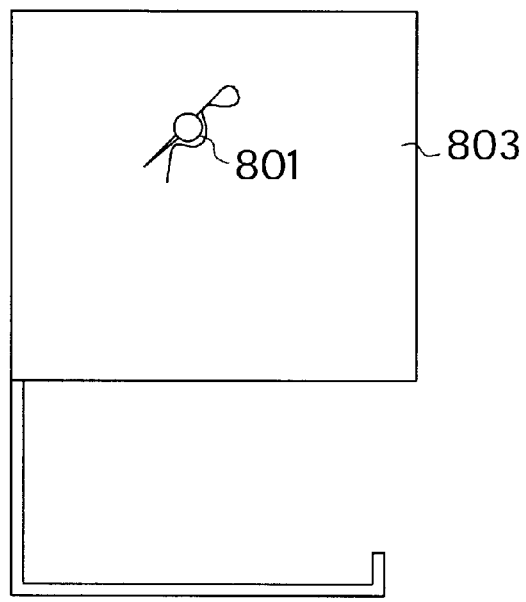
FIG. 23 is an enlarged detail view of a z-plate element according to the embodiment depicted in FIG. 22.
Figure 24:
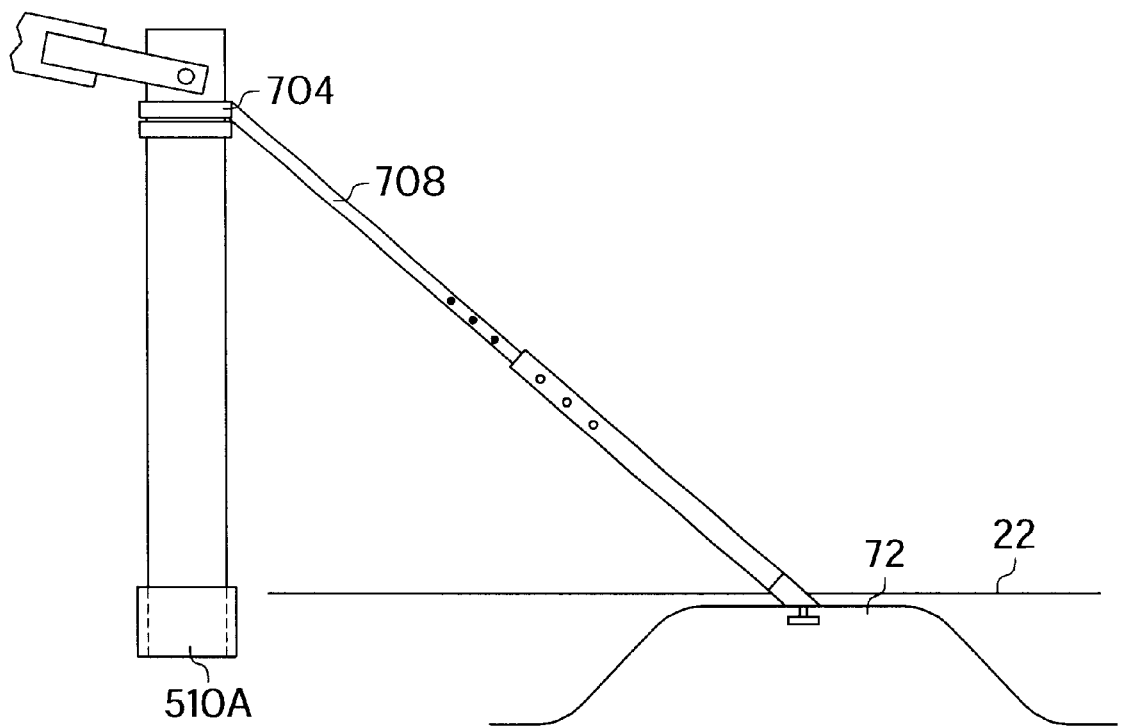
FIG. 24 is a side view of an alternative brace element according to the embodiment depicted in FIG. 22.

FIG. 22 shows a rear view of an additional auxiliary side-arm 700 in combination with the crane 600A. The side arm 700 pivots within the collar 510 and has a second support collar 510A at its other end. The crane 600A fits within the collar 510A, rotating about its vertical column 602. When the side arm 700 is not rotated, collar 510 and the vertical column 602 are moved. A support line 702 tethering the crane 600A, connects an upper crane anchor band 704 to the wheel well 72. The support line 702 gives compensating support to the top of the crane 600A when the crane top is pulled in any direction. Supporting the swing arm collar 510A from below is a z-plate 706 resting on the truck bed 12, also shown in greater detail in FIG. 23 where a pin 801 is disposed through anchor plate end 803. FIG. 24A shows a brace 708 of solid construction, an alternative to the line 702, for providing support to the crane top. The brace 708 compensates for forces pulling both forward as well as rearward.

Figure 25:
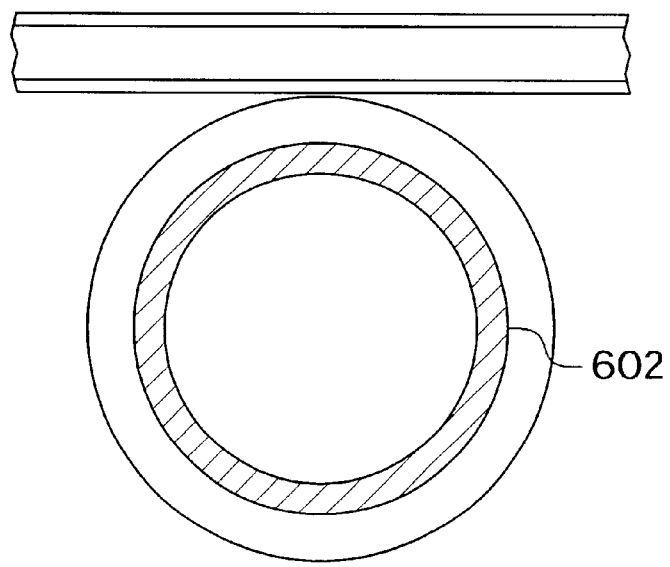
FIG. 25 is a top view of an embodiment of bracket interconnections of the collar, winch and storage container module according to the present invention.

The interconnections of the winches and cranes to each other and to the storage module of the present invention may be variably configured without departing from the scope of the present invention. An alternative configuration of the winches relative to a crane 600 is shown in FIG. 25, a depiction which shows a bottom view of a bracket 800, a rotatable band 900 and an electric winch 400B.

Sized to fit closely about the crane vertical column 602, the rotatable band 900 is able to rotate freely about the crane vertical column 602. The band 900 is utilized by inserting the crane vertical column 602 through the band 900 prior to inserting the crane vertical column 602 into the collar 510. Rotating the band 900 about the crane vertical column 602 enables the electric winch 400B to be optimally positioned with respect to the crane arm 604 position. The bracket 800 is affixed to the band 900 for providing a readily changeable attachment for the electric winch 400B.

The bracket 800 includes a bracket fitting 802 and a bracket frame 804. The bracket frame 804 is open on only one of its four sides. The bracket fitting 802 slides into the open side of the bracket frame 804. In an alternative arrangement (not depicted), the bracket frame 804 can be affixed to the rotatable band 900 so that its open side faces horizontally instead of downward. The bracket fitting 802 would then be attached to the electric winch 400B in an orientation rotated 900 relative to the orientation depicted in FIG. 25. The bracket fitting 802 could thus slide sideways in to the bracket frame 804 while still maintaining the electric winch 400B in the same horizontal orientation as depicted in FIG. 25. A second bracket frame 804 is shown attached to the band 900 for the receipt of a second winch (not depicted). The second winch may be a hand winch, affixed to a second bracket fitting 802 (not depicted). The second bracket frame also alternatively has a side opening (not depicted).

In view of the above, it will be seen that the various objects and features of the invention are achieved and other advantageous results obtained. The examples contained herein are merely illustrative and are not intended in a limiting sense.

What is claimed is:

1. A truck bed modular storage apparatus comprising:
   a storage container module for deploying in combination with a portion of a longitudinally sectioned truck bed, said storage container module including a housing and at least one drawer;
   said housing having first and second longitudinal sides, first and second open ends, a top and a bottom, said first and second ends having mirror image configurations, said top having an upper surface;
   said drawer slidably disposed longitudinally in said housing, said drawer having a top, a bottom, a front face, a back face, and third and fourth longitudinal sides;
   said housing adapted for securing to a truck bed in first and second positions, said first position for effecting a secured relation of the first longitudinal side of the housing to a first truck bed side rail, said second position for effecting a secured relation of the first longitudinal side of the housing to a second truck bed side rail;
   said drawer slidably disposed in the housing in a first orientation, said first orientation entailing said front face being directed towards a back end of the truck;
   wherein said drawer is disposed in said first orientation when said housing is deployed for securing in the first position and said drawer is disposed in said first orientation when said housing is deployed for securing in the second position.

2. The modular storage apparatus of claim 1 wherein said first longitudinal side of said housing is adapted for accommodating a truck bed wheel well when said housing is in said first position and when said housing is in said second position.

3. The truck bed modular storage apparatus of claim 1 wherein the height of the housing module is intermediate the height of a truck bed wheel well and the height of a floor of the truck bed.

4. The truck bed modular storage apparatus of claim 1 wherein said housing further includes one or more fasteners suited for releasably securing the housing bottom to the truck bed, at least one of said fasteners in the vicinity of each of said housing open ends.

5. A first modular storage apparatus according to claim 1 wherein said housing second side is adapted for securing to a second modular storage apparatus' second side.

6. The truck bed modular storage apparatus of claim 5 further comprising a second modular storage apparatus wherein said first and second modular storage apparatuses provide a contiguous upper surface across the horizontal extent of the truck bed when secured together.

7. The first and second modular storage apparatuses of claim 6 wherein said secured together first and second modular storage apparatuses provide a space between the modular apparatuses and under said contiguous upper surface.

8. The secured together first and second modular storage apparatuses of claim 7, further comprising a gooseneck ball disposed in the space between said modular apparatuses.

9. The truck bed modular storage apparatus of claim 1 further including a stop device for a selective restriction of the sliding of the drawer in the housing.

* * * * *